(12) United States Patent
Helms

(10) Patent No.: US 10,635,493 B2
(45) Date of Patent: Apr. 28, 2020

(54) COMPUTING RESOURCE ALLOCATION BASED ON NUMBER OF ITEMS IN A QUEUE AND CONFIGURABLE LIST OF COMPUTING RESOURCE ALLOCATION STEPS

(71) Applicant: salesforce.com, inc., San Francisco, CA (US)

(72) Inventor: Jon R. Helms, Westfield, IN (US)

(73) Assignee: SALESFORCE.COM, INC., San Francisco, CA (US)

( * ) Notice: Subject to any disclaimer, the term of this patent is extended or adjusted under 35 U.S.C. 154(b) by 81 days.

(21) Appl. No.: 15/812,967

(22) Filed: Nov. 14, 2017

(65) Prior Publication Data

US 2019/0146840 A1 May 16, 2019

(51) Int. Cl.
*G06F 9/44* (2018.01)
*G06F 9/50* (2006.01)

(52) U.S. Cl.
CPC ............. *G06F 9/50* (2013.01); *G06F 9/5083* (2013.01); *G06F 2209/5011* (2013.01)

(58) Field of Classification Search
CPC ........................................................ G06F 9/44
See application file for complete search history.

(56) References Cited

U.S. PATENT DOCUMENTS

| | | | | |
|---|---|---|---|---|
| 5,517,566 A | * | 5/1996 | Smith ................... | H04M 3/51 379/265.03 |
| 6,064,678 A | * | 5/2000 | Sindhushayana ..... | H04L 1/0007 370/470 |
| 7,730,478 B2 | | 6/2010 | Weissman | |
| 7,779,039 B2 | | 8/2010 | Weissman et al. | |
| 9,900,264 B1 | * | 2/2018 | Chen ................... | H04L 47/783 |
| 2003/0064730 A1 | * | 4/2003 | Chen ................... | H04W 72/10 455/453 |

(Continued)

OTHER PUBLICATIONS

Chandra, et al., "Dynamic Resource Allocation for Shared Data Centers Using Online Measurements," SIGMETRICS '03 Proceedings of the 2003 ACM SIGMETRICS international conference on Measurement and modeling of computer systems, ACM, Jun. 2003, 18 pages.

(Continued)

*Primary Examiner* — Jae U Jeon
(74) *Attorney, Agent, or Firm* — Nicholson De Vos Webster & Elliott LLP

(57) ABSTRACT

A method by a computing device to allocate computing resources for processing items in a queue using a list of computing resource allocation steps. The method includes determining a total amount of computing resources that are to be allocated for processing items in the queue based on a current number of items in the queue and the list of computing resource allocation steps, where the list of computing resource allocation steps specifies a plurality of ordered steps. Each step in the plurality of ordered steps defines a rate at which additional computing resources are allocated for processing items in the queue when the number of items in the queue is within a particular range. The method further includes adjusting an amount of computing resources allocated for processing items in the queue to match the determined total amount.

20 Claims, 7 Drawing Sheets

(56) References Cited

U.S. PATENT DOCUMENTS

| | | | |
|---|---|---|---|
| 2003/0084730 A1* | 5/2003 | Komine | G01N 3/08 |
| | | | 73/798 |
| 2005/0080658 A1* | 4/2005 | Kohn | G06Q 10/04 |
| | | | 705/7.14 |
| 2011/0265088 A1 | 10/2011 | Devadhar et al. | |
| 2012/0151063 A1 | 6/2012 | Yang et al. | |
| 2014/0201752 A1* | 7/2014 | Agrawal | G06F 9/5011 |
| | | | 718/104 |
| 2014/0379924 A1* | 12/2014 | Das | H04L 47/72 |
| | | | 709/226 |
| 2016/0117195 A1 | 4/2016 | Wang | |
| 2016/0119246 A1 | 4/2016 | Wang | |
| 2016/0266930 A1* | 9/2016 | Jones | G06Q 10/06311 |
| 2017/0061364 A1 | 3/2017 | Waltz | |
| 2018/0279261 A1* | 9/2018 | Kobayashi | H04W 40/04 |

OTHER PUBLICATIONS

Jagannathan, et al., "Effective Resource Allocation in a Queue: How Much Control is Necessary?" Communication, Control, and Computing, 2008 46th Annual Allerton Conference on, IEEE, Sep. 2008, 8 pages.

Saraswathi, et al., "Dynamic Resource Allocation Scheme in Cloud Computing," ScienceDirect, Elsevier B.V., Procedia Computer Science, vol. 47, May 2015, pp. 30-36.

The LeSS Company B.V., "Queueing Theory," downloaded from https://less.works/less/principles/queueing_theory.html on Nov. 9, 2017, 22 pages. (No publication date available).

* cited by examiner

COMPUTING RESOURCE ALLOCATION BASED ON NUMBER OF ITEMS IN A QUEUE AND CONFIGURABLE LIST OF COMPUTING RESOURCE ALLOCATION STEPS

TECHNICAL FIELD

One or more implementations relate to the field of computing resource allocation, and more specifically, to computing resource allocation for processing items in a queue.

BACKGROUND

"Cloud computing" services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Clouds may provide a collection of computing resources that can be utilized to perform batch processing of a large number of work items (sometimes referred to as "jobs" or simply as "items"). Items that need to be processed are typically placed in a queue, where they wait to be processed. The cloud may allocate a certain amount of computing resources for processing items in the queue. The cloud can then process the items in the queue using the allocated computing resources, for example, in a first-in-first-out (FIFO) manner. The number of items in the queue can vary over time depending on the number of new items that are added to the queue, the computational complexity of the items in the queue, the amount of resources allocated for processing items in the queue, and other factors.

The cloud can dynamically allocate computing resources for processing items in a given queue. One way that the datacenter dynamically allocates computing resources is by allocating computing resources in a simple linear fashion with respect to the number of items in the queue. Stated differently, the cloud allocates computing resources such that the amount of computing resources that are allocated for processing items in the queue increases linearly with respect to the number of items in the queue. For example, one formula for determining the amount of computing resources to allocate for processing items in a queue is X/D, up to M, where X is the number of items in the queue, D is the number of items per computing resource, and M is the maximum amount of computing resources that can be allocated. Allocating computing resources based on this formula may lead to poor computing resource utilization. For example, if D and M are set to 500 and 20, respectively, then a queue that has 1,000,000 items would be allocated 20 computing resources (the maximum amount allowed), which may not be sufficient. If D and M are set to 5,000 and 100, respectively, then a queue that has 4,000 items would be allocated a single computing resource, and thus process slowly. D can be lowered to allocate more computing resources. However, if multiple systems use the same formula for allocating computing resources, computing resources may be consumed too quickly if M is not lowered. If both D and M are lowered, then queues having a relatively small number of items will process quickly, but queues having a relatively large number of items will not be allocated sufficient computing resources. As such, a simple linear computing resource allocation scheme such as the one described above does not provide the flexibility to accommodate efficient processing for both large and small numbers of items in a queue.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for allocating computing resources for processing items in a queue using a list of computing resource allocation steps (also referred to herein as "computing resource allocation tiers"). According to some implementations, the total amount of computing resources that are to be allocated for processing items in a queue is determined based on the current number of items in the queue and a list of computing resource allocation steps. The list of computing resource allocation steps specifies a plurality of ordered steps (also referred to herein as "ordered tiers"), where each step in the plurality of ordered steps defines a rate at which additional computing resources are allocated for processing items in the queue when the number of items in the queue is within a particular range. The amount of computing resources for processing items in the queue can then be adjusted to match the determined total amount. In this way, implementations described herein enable a "stepped" (also referred to a "tiered") computing resource allocation scheme, where the rate at which additional computing resources are allocated (with respect to the increase in the number of items) for processing items in a queue can change as the number of items in the queue changes, according to the list of computing resource allocation steps. This is in contrast to conventional computing resource allocation schemes where the rate at which additional computing resources are allocated is constant regardless of the number of items in the queue (e.g., the above described simple linear computing resource allocation scheme). The stepped computing resource allocation scheme allows for more flexible (and configurable) computing resource allocation when compared to conventional computing resource allocation schemes.

Figure 1:
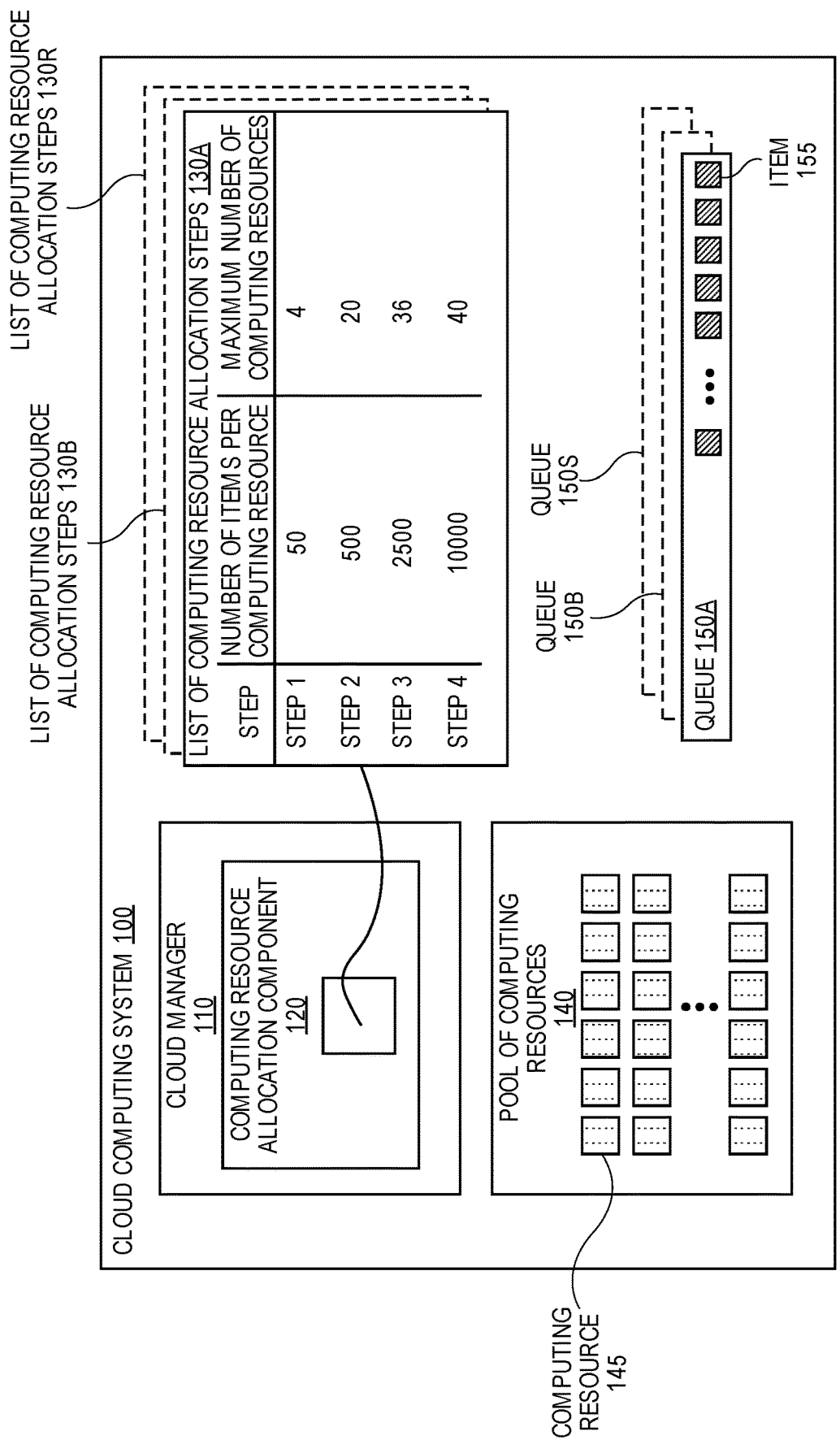
FIG. 1 is a diagram of a cloud computing system in which computing resources for processing items in a queue can be dynamically allocated using a list of computing resource allocation steps, according to some implementations.

FIG. 1 is a diagram of a cloud computing system in which computing resources for processing items in a queue can be dynamically allocated using a list of computing resource allocation steps, according to some implementations. The cloud computing system 100 is a system that is configured to provide various cloud computing services on behalf of users. In an implementation, the cloud computing system 100 implements a multi-tenant cloud computing architecture supporting multiple services, such as software as a service, platform as a service, and/or infrastructure as a service. As shown in the diagram, the cloud computing system 100 includes a cloud manager 110, a pool of computing resources 140, and at least one queue 150 (e.g., queues 150A-S). The cloud manager 110 is configured to manage various aspects of the cloud computing system 100 as it pertains to providing cloud computing services. For example, the cloud manager 110 may be configured to perform performance monitoring, enforce security policies, and allocate computing resources in the cloud computing system. Cloud computing services may perform various computing tasks to provide services for users. Computing tasks can be subdivided into smaller chunks of discrete computing tasks referred to herein as "work items" or simply as "items." Cloud computing services may place items 155 that need to be processed into a queue 150 (sometimes referred to as "enqueuing"). For example, as shown in the diagram, a number of items 155 have been added to queue 150A. A queue 150 provides a temporary place for items to be stored while they wait to be processed. Items 155 can be removed from the queue 150 (sometimes referred to as "dequeuing") and processed when computing resources 145 become available to process those items 155. In an implementation, the one or more queues 150 are first-in-first-out (FIFO) queues (so items 155 in the queue 150 are dequeued and processed in the order that they arrived at the queue 150). In different implementations, the computing resources 145 may all be of the same type or be a mixture of types (e.g., threads, software containers (see below), applications, processor cores, computing devices, a mixture thereof, etc.).

In an implementation, the cloud manager 110 includes a computing resource allocation component 120. The computing resource allocation component 120 is configured to determine the amount of computing resources 145 (that is, how many from the pool of computing resources 140) to allocate for processing items in a queue 150 (e.g., queue 150A) and allocating those computing resources 145. In an implementation, the computing resource allocation component 120 stores or otherwise has access to at least one list of computing resource allocation steps 130 (e.g., lists of computing resource allocation steps 130A-R). In an implementation, as will be described in additional detail below, the computing resource allocation component 120 determines the total amount of computing resources 140 that are to be allocated for processing items in a queue 150 based on the current number of items in the queue 150 and the list of computing resource allocation steps 130.

In an implementation, the list of computing resource allocation steps specifies a plurality of ordered steps, where each step specifies a number of items per computing resource for that step and the maximum number of computing resources for that step. As will become apparent from the present disclosure, each step effectively defines the rate at which additional computing resources 145 are to be allocated for processing items in a queue 150 when the number of items in the queue 150 is within a particular range. As used herein, $D_i$ denotes the number of items per computing resource for step i and $M_i$ denotes the maximum number of computing resources for step i.

As shown in the diagram, the list of computing resource allocation steps 130A specifies four steps (i.e., steps 1-4). Step 1 specifies that the number of items per computing resource is 50 ($D_1=50$) and the maximum number of computing resources is 4 ($M_1=4$). Step 2 specifies that the number of items per computing resource is 500 ($D_2=500$) and the maximum number of computing resources is 20 ($M_2=20$). Step 3 specifies that the number of items per computing resource is 2,500 ($D_3=2,500$) and the maximum number of computing resources is 36 ($M_3=36$). Step 4 specifies that the number of items per computing resource is 10,000 ($D_4=10,000$) and the maximum number of computing resources is 40 ($M_4=40$).

In an implementation, the computing resource allocation component 120 determines the total amount of computing resources 145 that are to be allocated to a queue 150 using the following equation:

$$\sum_{i=1}^{Z}\left(\text{MIN}\left(M_i, \left(\text{MAX}\left(0, \text{CEIL}\left(\frac{X - \sum_{j=0}^{i-1}(D_j M_j)}{D_i}\right)\right)\right)\right)\right) = N$$

In the equation, N refers to the amount of computing resources 145 to allocate, i refers to the current step number, Z refers the maximum step number, X refers to the number of items in the queue 150, D refers to the number of items per computing resource for a step, and M refers to the maximum number of computing resources for a step. Also, $D_0$ and $M_0$ are both defined to be 0. However, in an implementation, step 0 does not need to be explicitly specified in the list of computing resource allocation steps 130.

Exemplary C# code for determining the total amount of computing resources that are to be allocated for processing items 155 in a queue 150 is shown below. The exemplary code implements an algorithm that carries out the equation shown above using a list of computing resource allocation steps 130.

```
public class Calculator
{
    private List<Step> Steps;
    public Calculator(List<Step> steps)
    {
        Steps = steps;
    }
    public double GetResources(long depth)
    {
        return Steps.Sum(step=>
            Math.Min(step.MaxResourcesForStep, //Sets max for step
                as step max
            Math.Max(0, //Removes negatives
                Math.Ceiling( //Rounds up
                (
                    //Removes previous steps from queue depth
                    depth
```

```
            - Steps.Where(s => s.Number <
              step.Number).Sum(s => s.Size *
              s.MaxResourcesForStep)
            )
            / step.Size
          )//Close Ceiling
        )//Close max
      ) //Close min
    ); //Close outer sum
    }
}
public class Step
{
    public int Number { get; set; }
    public double Size { get; set; }
    public double MaxResourcesForStep { get; set; }
    public Step(int number, double size, double maxResourcesForStep) {
    Number = number; Size = size; MaxResourcesForStep =
    maxResourcesForStep; }
}
```

The algorithm enables a "stepped" computing resource allocation scheme, where the rate at which additional computing resource are allocated for processing items in a queue 150 can change as the number of items 155 in the queue 150 changes, according to the list of computing resource allocation steps 130. This is in contrast to conventional computing resource allocation schemes where the rate at which additional computing resources are allocated is constant regardless of the number of items 155 in the queue 150 (e.g., the previously described simple linear computing resource allocation scheme). The steps in the list of computing resource allocation steps 130 can be configured as desired. For example, the number of steps, as well as the number of items per computing resource (D) and maximum number of computing resources (M) for each step can be configured as desired. The same equation and/or algorithm can be used with different step configurations to achieve different computing resource allocation schemes. The stepped computing resource allocation scheme allows for more flexible (and configurable) computing resource allocation when compared to conventional computing resource allocation schemes.

As mentioned above, the exemplary list of computing resource allocation steps 130A shown in FIG. 1 specifies four steps. According to step 1, one computing resource 145 is allocated for every 50 items in the queue 150, up to a maximum of 4 computing resources 145. Thus, computing resources 145 are allocated at the rate of one computing resource 145 per 50 items, up to a maximum of 4 computing resources 145.

According to step 2, one computing resource 145 is allocated for every 500 items in the queue 150, up to a maximum of 20 computing resources 145. Thus, if the number of items 155 in the queue 150 is greater than 200 (which is the maximum number of items 155 that is covered by the previous step (i.e., step 1)), then computing resources 145 are allocated at the rate of one computing resource 145 per 500 items, up to a maximum of 20 computing resources.

According to step 3, one computing resource 145 is allocated for every 2,500 items in the queue 150, up to a maximum of 36 computing resources 145. Thus, if the number of items 155 in the queue 150 is greater than 10,200 (which is the maximum number of items 155 that is covered by the previous steps (i.e., step 1 and step 2)), then computing resources 145 are allocated at the rate of one computing resource per 2,500 items, up to a maximum of 36 computing resources.

According to step 4, one computing resource 145 is allocated for every 10,000 items in the queue 150, up to a maximum of 40 computing resources. Thus, if the number of items 155 in the queue 150 is greater than 100,200 (which is the maximum number of items 155 that is covered by the previous steps (i.e., step 1, step 2, and step 3)), then computing resources 145 are allocated at the rate of one computing resource 145 per 10,000 items, up to a maximum of 40 computing resources 145. The maximum amount of computing resources 145 that can be allocated is the sum of the maximum number of computing resources 145 for each step, which in this example is 100 (4+20+36+40=100).

The total amount of computing resources 145 that are to be allocated with respect to different queue depths (i.e., number of items in the queue 150) according to the exemplary computing resource allocation scheme described above (and shown in FIG. 1) is shown in Table I below:

TABLE I

| Number of Items in Queue | Amount of Computing Resources |
|---|---|
| 150 | 3 |
| 200 | 4 |
| 201 | 5 |
| 9,500 | 23 |
| 10,000 | 24 |
| 10,501 | 25 |
| 12,500 | 25 |
| 12,701 | 26 |
| 97,500 | 59 |
| 97,701 | 60 |
| 100,000 | 60 |
| 100,201 | 61 |
| 102,501 | 61 |
| 110,000 | 61 |
| 110,201 | 62 |
| 490,000 | 99 |
| 490,201 | 100 |
| 500,000 | 100 |
| 5,000,000 | 100 |

In this exemplary computing resource allocation scheme, the rate at which computing resources 145 are allocated is higher when the number of items 155 in the queue 150 is smaller and the rate is lower when the number of items 155 in the queue 150 is larger. As mentioned above, the list of computing resource allocation steps 130 can be configured to achieve different computing resource allocation schemes. For example, the list of computing resource allocation steps 130 can be configured such that the rate at which computing resources 145 are allocated is lower when the number of items 155 in the queue 150 is smaller and the rate is higher when the number of items 155 in the queue 150 is larger. In yet another example, the list of computing resource allocation steps 130 can be configured such that the rate at which computing resources 145 are allocated is constant (e.g., by configuring the list of computing resource allocation steps to have a single step). Various other schemes are also possible.

Different implementations may support different ones of or multiple ways and/or formats for the provision of a list 130. For example, the computing resource allocation component 120 may access a list of computing resource allocation steps 130 from a database (e.g., a relational database). As another example, the computing resource allocation component 120 may receive the list of computing resource allocation steps 130 via an Application Programming Interface (API) (e.g., along with the items to be processed). By way of example, the list of computing resource allocation steps 130 may be represented in JavaScript Object Notation (JSON) format (e.g., for storage in a database and/or for transmission via an API). By way of specific example, the list of computing resource allocation steps 130A shown in FIG. 1 may be represented in JSON format as follows:

```
[
    {
        "Number": 1,
        "Size": 50,
        "MaxResourcesForStep": 4
    },
    {
        "Number": 2,
        "Size": 500,
        "MaxResourcesForStep": 20
    },
    {
        "Number": 3,
        "Size": 2500,
        "MaxResourcesForStep": 36
    },
    {
        "Number": 4,
        "Size": 10000,
        "MaxResourcesForStep": 40
    }
]
```

In the JSON representation, "number" refers to the step number, "size" refers to the number of items per computing resource for that step, and "MaxResourcesForStep" refers to the maximum number of computing resources for that step. It should be understood that the list of computing resource allocation steps 130 can be represented differently than shown above and can be represented using formats other than JSON.

In an implementation, there can be multiple lists of computing resource allocation steps 130 (e.g., 130A-R). Each list 130 may be configured differently (e.g., specify a different number of steps and/or specify different numbers of items per computing resource (D) and/or maximum numbers of computing resources (M) for the steps (that is, the D and M values for each of the steps can be configured as desired)) to achieve a desired computing resource allocation scheme. In an implementation, each queue 150 (e.g., queues 150A-S) is associated with a single one of the lists of computing resource allocation steps 130 and the computing resource allocation component 120 allocates computing resources for processing items 155 in a queue 150 according to the list of computing resource allocation steps 130 associated with that queue 150. In an implementation, the computing resource allocation component 120 keeps track of the list 130 that is associated with each queue 150. Also, the computing resource allocation component 120 may keep track of the current amount of computing resources 145 allocated for each queue 150. This allows the computing resource allocation component 120 to adjust (e.g., deallocate computing resources 145, allocate additional computing resources 145, or keep existing allocation) the amount of computing resources 145 allocated for processing items in a given queue 150 to the appropriate amount (e.g., the amount determined using the equation or algorithm described above). In an implementation, the aforementioned information is stored in a data structure, a database, or other type of storage means.

Figure 2:
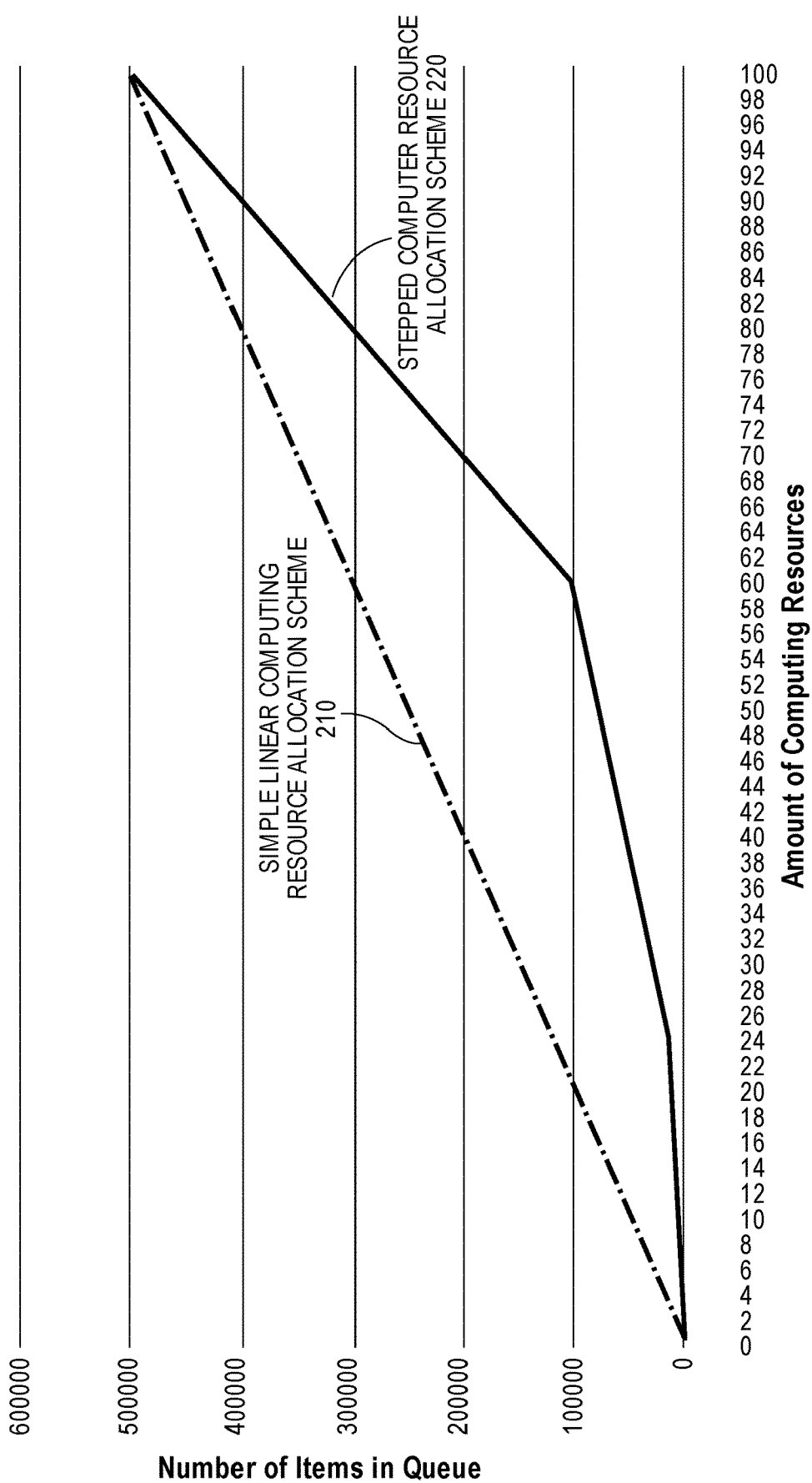
FIG. 2 is a graph illustrating the amount of computing resources allocated with respect to the number of items in a queue for a simple linear computing resource allocation scheme and a stepped computing resource allocation scheme, according to some implementations.

FIG. 2 is a graph illustrating the amount of computing resources allocated with respect to the number of items in a queue for a simple linear computing resource allocation scheme and a stepped computing resource allocation scheme, according to some implementations. The graph includes an x-axis and a y-axis. The x-axis of the graph represents the amount of computing resources 145 that are allocated (e.g., in terms of any of the computing resources 145 described above, including threads) and the y-axis of the graph represents the number of items 155 in the queue 150. As shown by the graph, the simple linear computing resource allocation scheme 210 allocates additional computing resources 145 at a constant rate with respect to the number of items 155 in the queue 150. Stated differently, the rate at which additional computing resources 145 are allocated is the same regardless of the number of items 155 in the queue 150. In contrast, the stepped computing resource allocation scheme 220 allocates additional computing resources 145 at different rates depending on the number of items 155 in the queue 150 (as indicated by changing slope of the line). For example, the rate at which the stepped computing resource allocation scheme allocates additional computing resources 145 gets progressively lower as the number of items 155 in the queue 150 increases (e.g., when the number of items in the queue reaches around 200, 10,200, and 100,200, respectively).

Figure 3:
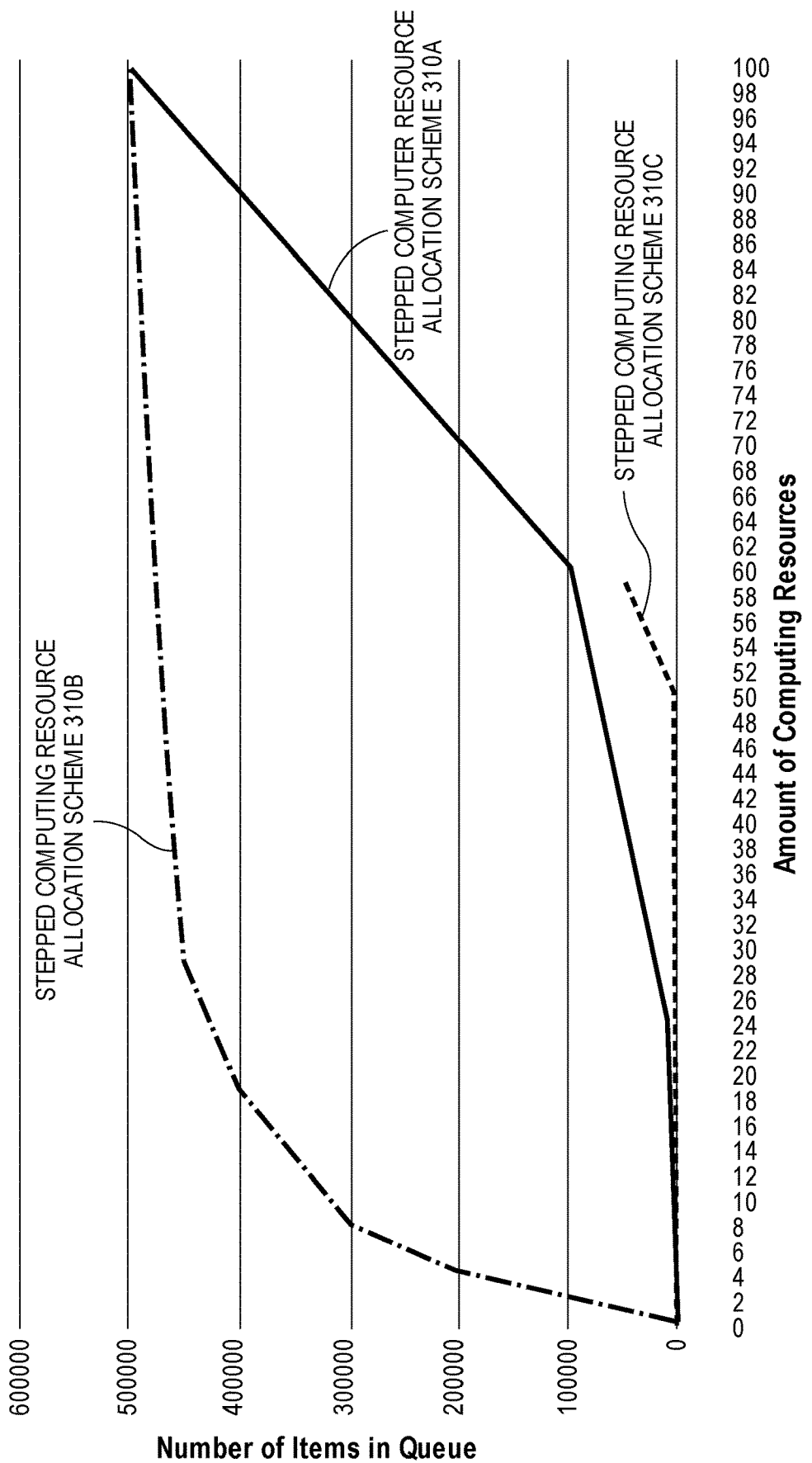
FIG. 3 is a graph illustrating the amount of computing resources allocated with respect to the number of items in a queue for various stepped computing resource allocation schemes, according to some implementations.

FIG. 3 is a graph illustrating the amount of computing resources allocated with respect to the number of items in a queue for various stepped computing resource allocation schemes, according to some implementations. The graph includes an x-axis and a y-axis. The x-axis of the graph represents the amount of computing resources 145 that are allocated (e.g., in terms of any of the computing resources 145 described above, including threads) and the y-axis of the graph represents the number of items 155 in the queue 150. As shown by the graph, the rate at which the first stepped computing resource allocation scheme 310A allocates additional computing resources 145 gets progressively lower as the number of items 155 in the queue 150 increases (e.g., when the number of items 155 in the queue 150 reaches around 200, 10,200, and 100,200, respectively—this is similar to the stepped computing resource allocation scheme 220 shown in FIG. 2). The maximum number of computing resources 145 that are allocated for the first stepped computing resource allocation scheme 310A is 100. The first stepped computing resource allocation scheme 310A can be achieved, for example, by configuring the list of computing resource allocation steps 130 such that it includes at least a first step and a second step that is later in order than the first step, where the rate (at which additional computing resources 145 are allocated) defined by the first step is higher than the rate defined by the second step. The rate at which the second stepped computing resource allocation scheme 310B allocates additional computing resources 145 gets progressively higher as the number of items 155 in the queue 150 increases (e.g., when the number of items 155 in the queue 150 reaches around 200,000, 300,000, 400,000, and 450,000, respectively). The maximum number of computing resources 145 that are allocated for the second stepped computing resource allocation scheme 310B is 100. The second stepped computing resource allocation scheme 310B can be achieved, for example, by configuring the list of computing resource allocation steps 130 such that it includes at least a first step and a second step that is later in order than the first step, where the rate (at which additional computing resources 145 are allocated) defined by the first step is lower than the rate defined by the second step. The rate at which the third stepped computing resource allocation scheme 310C allocates additional computing resources 145 is initially very high, but then gets lower when the number of items 155 in the queue 150 reaches a threshold value. The maximum number of computing resources 145 that are allocated for the third stepped computing resource allocation scheme 310C is 60. It should be understood that various other schemes other than the ones shown in the graph are also possible (e.g., a "bell curve" computing resource allocation scheme where the rate at which computing resources are allocated gets progressively higher and then gets progressively lower). A given computing resource allocation scheme may be more suitable depending on the application/context. For example, if there is a first service that provides data to a second service and the second service processes that data slowly, there will not be much added benefit to allocating additional computing resources 145 for the first service beyond a certain point (since the second service acts as a bottleneck). In this case, a computing resource allocation scheme where the rate at which computing resources 145 are allocated gets progressively lower (e.g., computing resource allocation scheme 310A) may be more suitable for the first service. As another example, services for premium users (e.g., customers that pay for a premium account) may utilize a computing resource allocation scheme where the initial rate (e.g., the rate at step 1) at which computing resources 145 are allocated is higher than the rate for non-premium users, and then eventually returns to the normal (non-premium) rate (e.g., at step 2) when the number of items in the queue 150 reaches a threshold.

Figure 4:
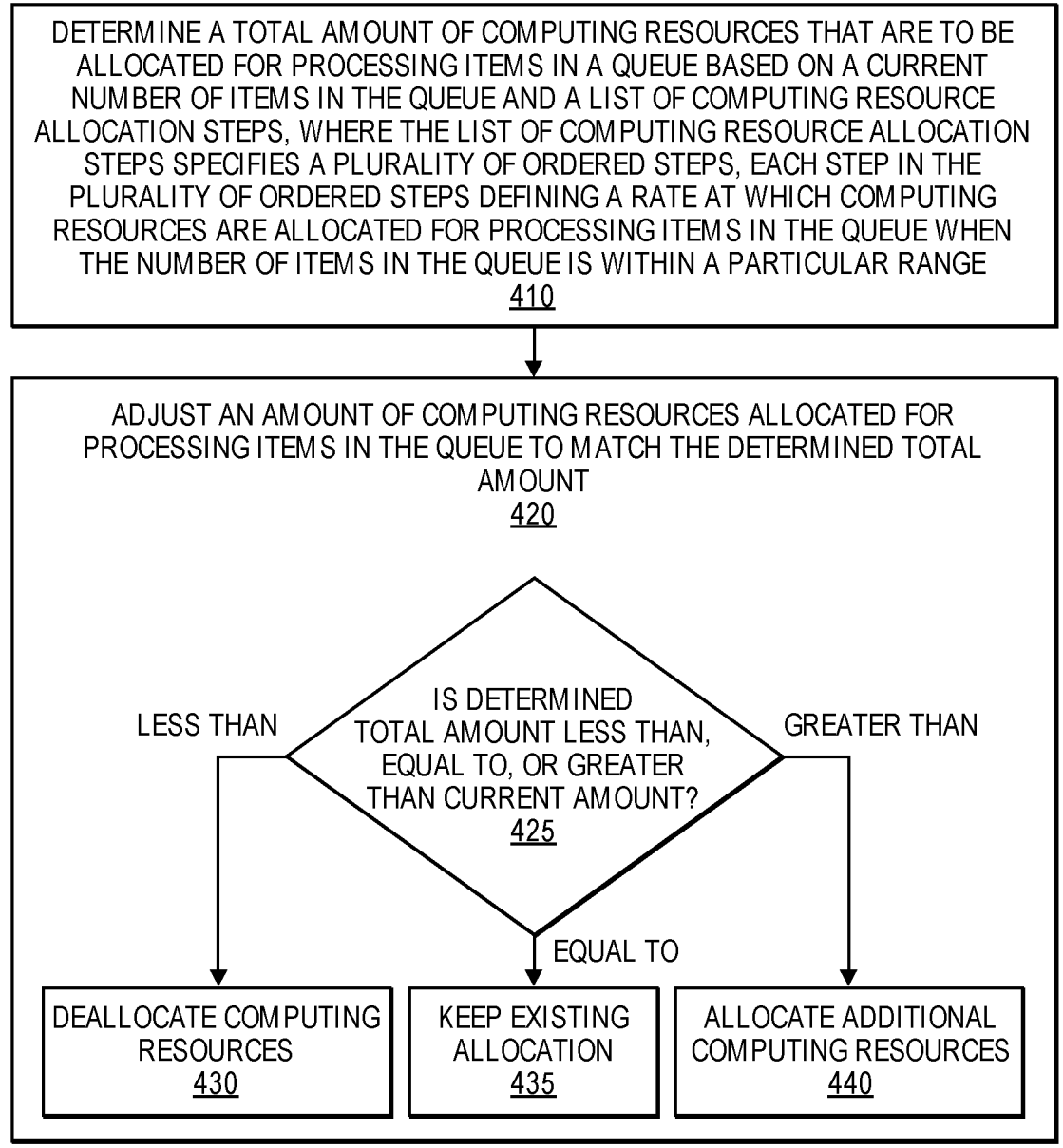
FIG. 4 is a flow diagram of a process for adjusting an amount of computing resources allocated for processing items in a queue using a list of computing resource allocation steps, according to some implementations.

FIG. 4 is a flow diagram of a process for adjusting an amount of computing resources allocated for processing items in a queue using a list of computing resource allocation steps, according to some implementations. In one implementation, the process is performed by a computing device (e.g., one that implements a computing resource allocation component 120). The process can be repeated as needed to adjust the amount of computing resources 145 that are allocated so that it reflects the current number of items in the queue 150 (since the number of items in the queue 150 will likely change over time). While in one implementation the process is performed periodically for each queue (e.g., every 5 minutes), other implementations repeat the process responsive to other triggers/conditions (e.g., whenever an item is added to the queue 150 and/or whenever an item is removed from the queue 150 (e.g., item can be removed from the queue when there are computing resources 145 assigned to process the item or when the item has been completely processed)). The operations in the flow diagrams will be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

The computing device determines a total amount of computing resources 145 that are to be allocated for processing items 155 in a queue 150 based on a current number of items 155 in the queue 150 and a list of computing resource allocation steps 130, where the list of computing resource allocation steps 130 specifies a plurality of ordered steps, each step in the plurality of ordered steps defining a rate at which additional computing resources 145 are allocated for processing items 155 in the queue 150 when the number of items 155 in the queue 150 is within a particular range (block 410). Different implementations may receive the list of computing resource allocation steps 130 in different ways and/or formats as described above. While in one implementation, the equation described above is used to determine the amount of computing resources 145 to allocate for processing items in the queue 150, other implementations may use variations of the equation.

As mentioned above, the list of computing resource allocation steps 130 can be configured to achieve the desired computing resource allocation scheme (e.g., any of the stepped computing resource allocation schemes described above).

The computing device then adjusts an amount of computing resources 145 allocated for processing items in the queue 150 to match the determined total amount (block 420). As part of block 420, the computing device determines whether the determined total amount is less than, equal to, or greater than the current amount of computing resources 145 that are already allocated for processing items in the queue 150 (decision block 425). If the determined total amount is less than the current amount, then the computing device deallocates computing resources 145 (to match the determined total amount) (block 430). If the determined total amount is equal to the current amount, then the computing device keeps the existing allocation (block 435). If the determined total amount is greater than the current amount, then the computing device allocates additional computing resources 145 (to match the determined total amount) (block 440). In an implementation that supports multiple lists and queues, the computing device may also determine a total amount of computing resources 145 to allocate for processing items 155 in others of queues 150 (e.g., a second queue) based on a current number of items 155 in that queue 150 and that queue's associated list of computing resource allocation steps 130, and adjust an amount of computing resources 145 allocated for processing items in that queue 150 to match the determined total amount of computing resources 145 to allocate for processing items 155 in that queue 150.

Figure 5:
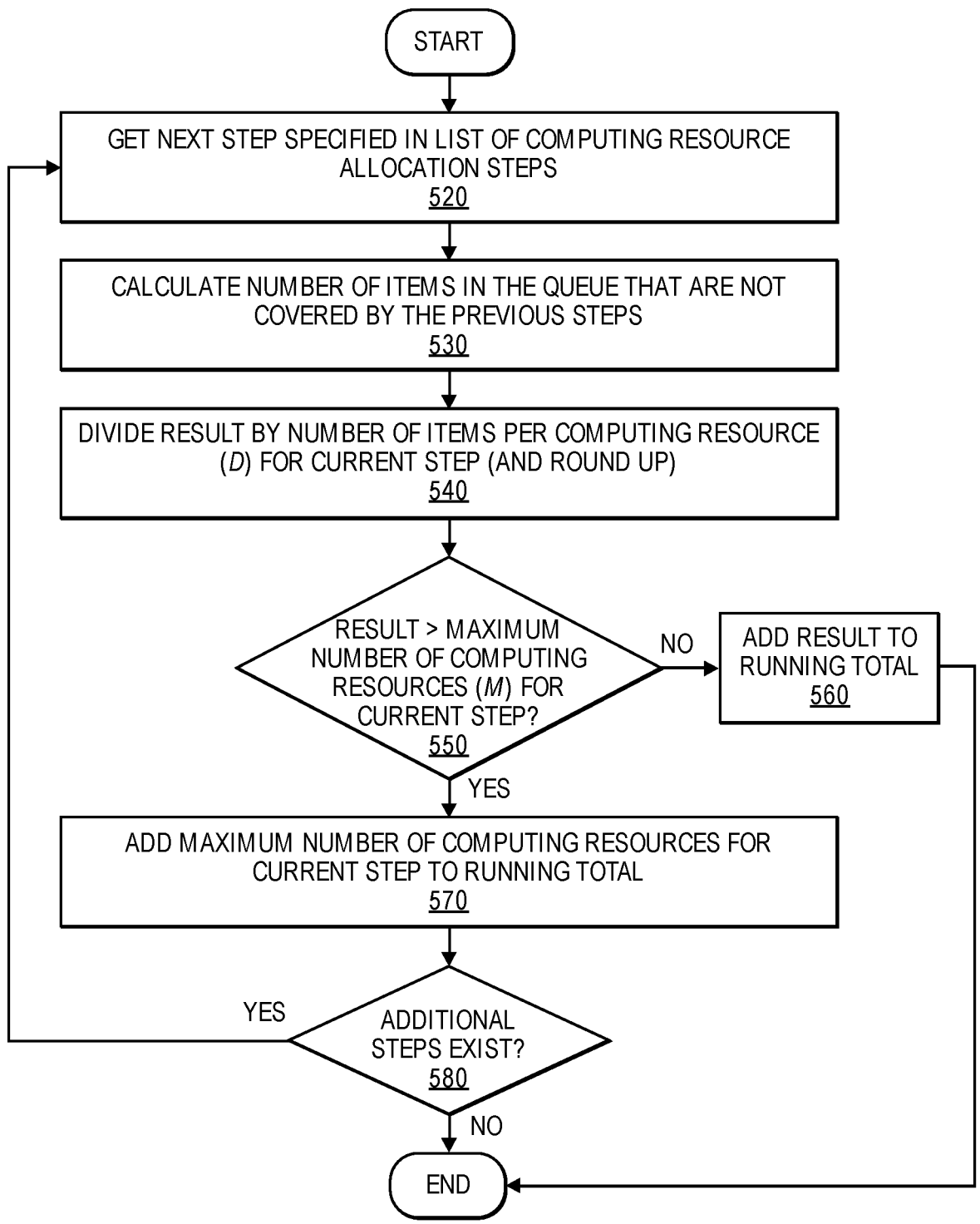
FIG. 5 is a flow diagram illustrating a process for determining the total amount of computing resources that are to be allocated for processing items in a queue, according to some implementations.

FIG. 5 is a flow diagram illustrating a process for determining the total amount of computing resources that are to be allocated for processing items in a queue, according to some implementations. In one implementation, the process is performed by a computing device (e.g., one that implements a computing resource allocation component 120). In one implementation, the process can be used to perform the operation of block 410 of FIG. 4. The process maintains a running total that (at the end of the process) indicates the total amount of computing resources 145 that are to be allocated. The running total is set to 0 every time the process in FIG. 5 is performed (it is stateless in terms of what the process previously calculated).

The computing device gets the next step (step i) specified in a list of computing resource allocation steps 130 (block 520). While in some implementations the computing device may receive (e.g., from a database, through an API) the list of computing resource allocation steps 130 each time block 520 is performed, other implementation may operate differently (e.g., the computing device receive the list as part of initialization (e.g., the first time block 520 is performed for a given queue) and store it in local storage so that it has local access to it (e.g., subsequent times block 520 is performed for a given queue the list is available without having to access a database or having to call an API)). For the first-time block 520 is performed, the computing device gets the first step specified in the list of computing resource allocation steps 130 (e.g., step 1). The step specifies the number of items per computing resource for that step ($D_i$) and the maximum number of computing resources for that step ($M_i$). The computing device then calculates the number of items 155 in the queue 150 that are not covered by the previous steps (e.g., $X - \Sigma_{j=0}^{i-1}(D_j M_j)$), where i refers to the current step number, X refers to the number of items 155 in the queue 150, D refers to the number of items per computing resource for a step, and M refers to the maximum number of computing resources for a step, and $D_0$ and $M_0$ are both defined to be 0) (block 530). The computing device then divides the result of block 530 by the number of items per computing resource for the current step ($D_i$) (and rounds up) (block 540). The computing device then determines whether the result of block 540 is greater than the maximum number of computing resources for the current step ($M_i$) (decision block 550). If the result of block 540 is not greater than the maximum number of computing resources for the current step, then the computing device adds the result of block 540 to the running total (block 560) and the process ends. However, if the result of block 540 is greater than the maximum number of computing resources for the current step, then the computing device adds the maximum number of computing resources for the current step ($M_i$) to the running total (block 570) and determines whether additional steps exist in the list of computing resource allocation steps 130 (decision block 580). If additional steps exist, then the computing device returns to block 520 to get the next step (e.g., if the current step is step i then the next step is step i+1). The computing device may repeat the operations of blocks 520-580 (where applicable) for the next step and any subsequent steps. Returning to decision block 580, if additional steps do not exist (the current step is the last step in the list of computing resource allocation steps 130), then the process ends. The running total at the end of the process is the total amount of computing resources 145 that are to be allocated for processing items 155 in the queue 150.

It should be understood that various modifications can be made to the process of determining the total amount of computing resources 145 that are to be allocated for processing items in a queue 150 without departing from the spirit and scope of the disclosure provided herein. For example, the process can be performed using the projected number of items in the queue 150 (e.g., projected queue depth in the next 30 minutes) instead of the current number of items in the queue 150 (to allocate computing resources 145 in advance of need). As another example, the process may take into account the current resource utilization when determining the amount of computing resources 145 to allocate (e.g., if Central Processing Unit (CPU) and/or Random Access Memory (RAM) is nearly maxed out, then the rate of allocation can become slower).

It should be understood that the stepped computing resource allocation functionality described above can be implemented in alternative ways. For example, an implementation may keep track of which step in the list of computing resource allocation steps a given queue is currently at and determine whether to allocate/deallocate computing resources based on this information (e.g., based on the rate for the current step). Another implementation may store a mapping between a range of queue depths (i.e., number of items in a queue 150) and the total amount of computing resources that are to be allocated when the number of items in a queue 150 falls within that range.

One or more parts of the above implementations may include software and/or a combination of software and hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), Flash memory, phase change memory, solid state drives (SSDs)) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists the code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) to store the code/data when the electronic device is turned off, and that same non-volatile memory has sufficiently fast read/write times such that, rather than copying the part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 6:
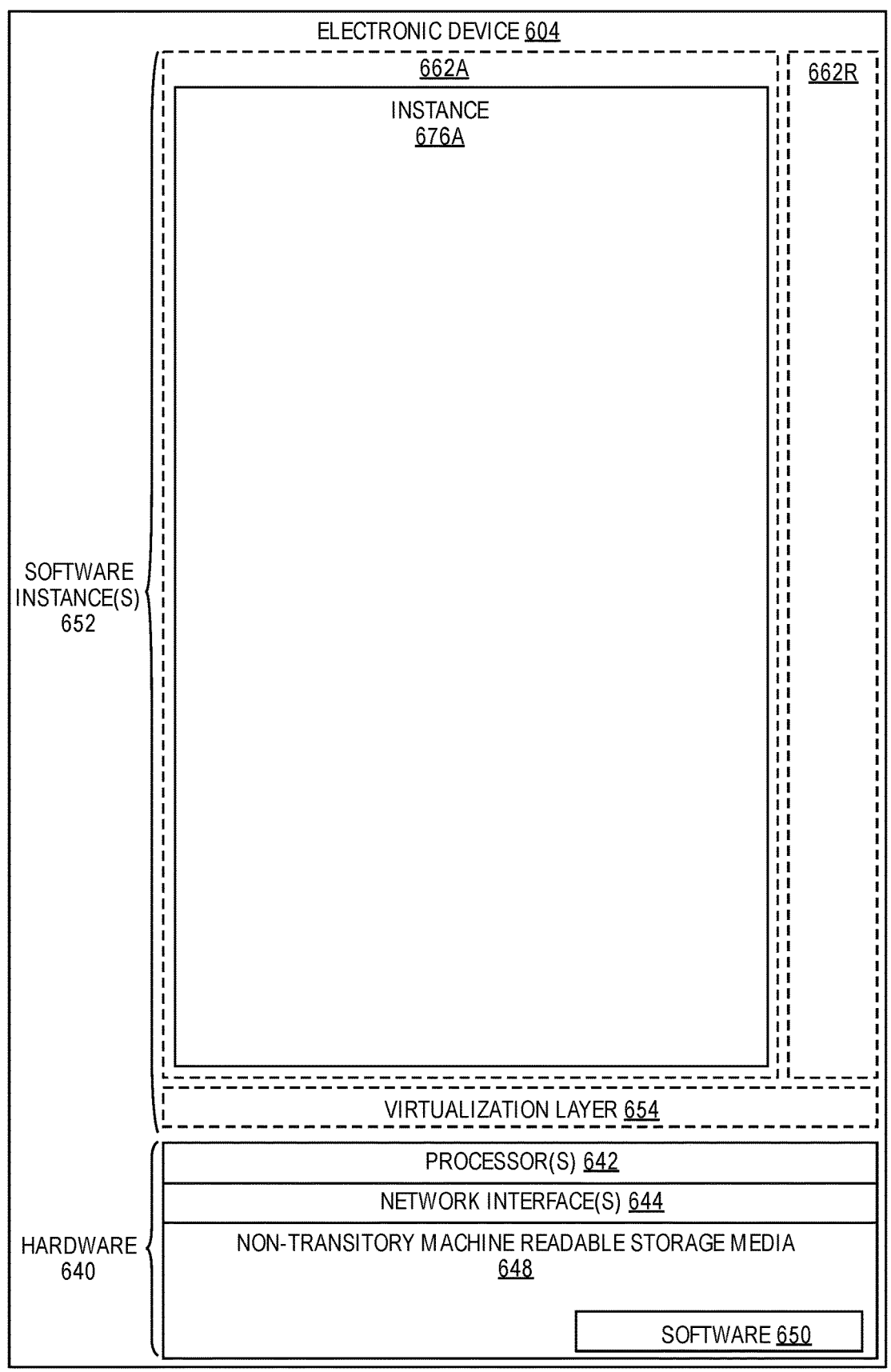
FIG. 6 illustrates an electronic device according to some implementations.
Figure 7:
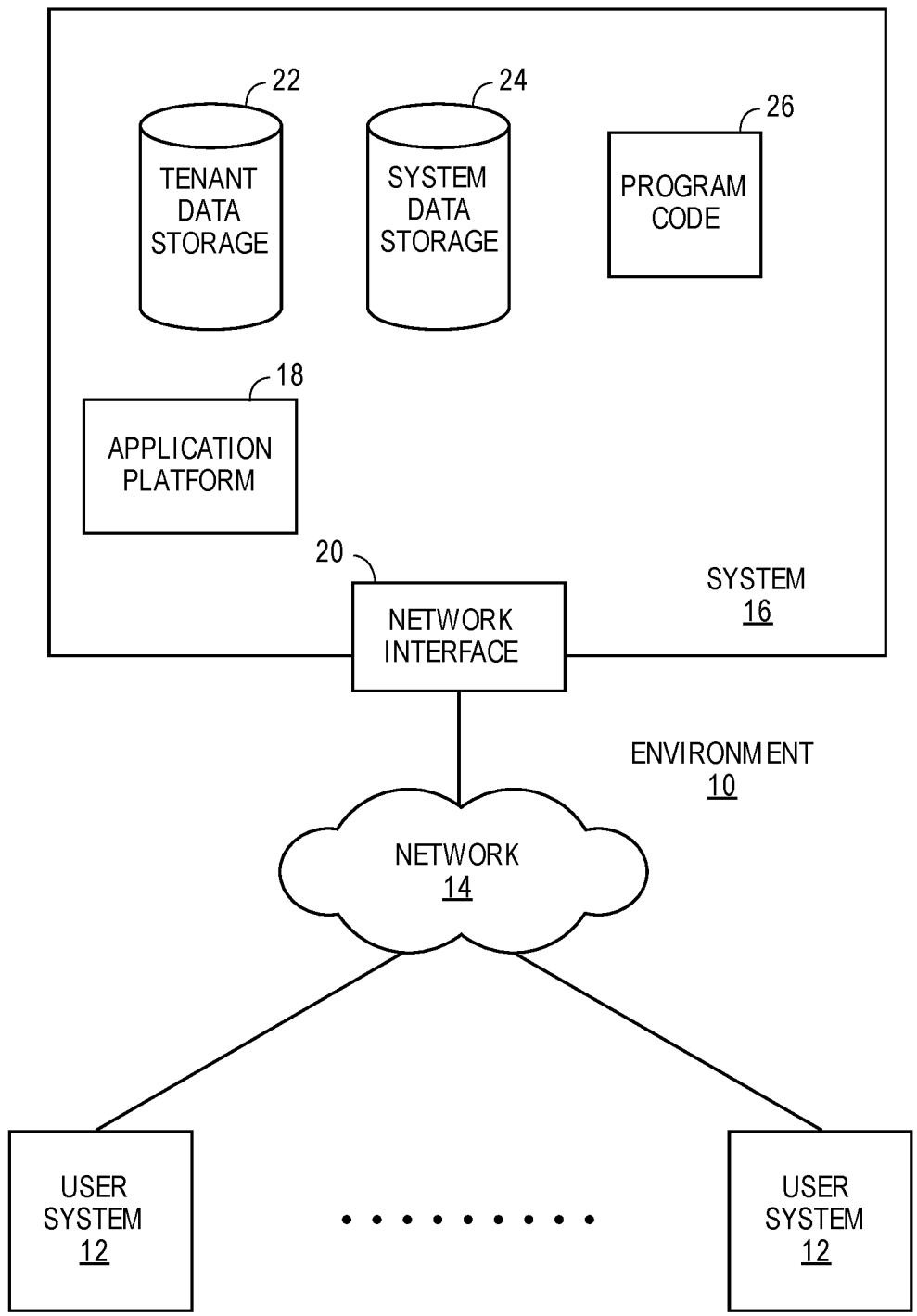
FIG. 7 shows a block diagram of an example of an environment in which stepped computing resource allocation may be used in accordance with some implementations.

FIG. 6 illustrates an electronic device 604 according to some implementations. FIG. 6 includes hardware 640 comprising a set of one or more processor(s) 642, a set or one or more network interfaces 644 (wireless and/or wired), and non-transitory machine-readable storage media 648 having stored therein software 650. Each of the previously described cloud computing system 100, cloud manager 110, computing resource allocation component 120 may be implemented in one or more electronic devices 604. In one implementation, each of the end user clients that access cloud computing system 100 is implemented in a separate one of the electronic devices 604 (e.g., in an end user electronic device operated by an end user; in which case, the software 650 in each such end user electronic device includes the software to implement one of the end user clients, including software to interface with a cloud computing service (e.g., an API, a web browser, a native client, a portal, a command-line interface, etc.)) and the cloud computing system 100 (including cloud manager 110 and computing resource allocation component 120) is implemented in a separate set of one or more of the electronic devices 604 (in which case, the software 650 is the software to implement the cloud computing services with stepped computing resource allocation); in operation, the end user electronic devices and the electronic device(s) implementing the cloud computing system 100 would be commutatively coupled (e.g., by a network) and would establish between them connections for requesting and providing cloud computing services. Other configurations of electronic devices may be used in other implementations.

In electronic devices that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 650 (illustrated as instance 676A) is executed within the software container 662A on the virtualization layer 654. In electronic devices where compute virtualization is not used, the instance 676A on top of a host operating system is executed on the "bare metal" electronic device 604. The instantiation of the instance 676A, as well as the virtualization layer 654 and software containers 662A-R if implemented, are collectively referred to as software instance(s) 652.

Alternative implementations of an electronic device may have numerous variations from that described above. For example, customized hardware and/or accelerators might also be used in an electronic device.

FIG. 9 shows a block diagram of an example of an environment 10 in which stepped computing resource allocation may be used in accordance with some implementations. Environment 10 may include user systems 12, network 14, and system 16, where system 16 includes application platform 18, network interface 20, tenant data storage 22, system data storage 24, and program code 26. In other implementations, environment 10 may not have all of these components and/or may have other components instead of, or in addition to, those listed above.

The system 16 includes hardware and software, and comprises the cloud computing system 100. User systems 12 are electronic devices used by one or more users that subscribe to services provided by the cloud computing services implemented by the system 16. User systems 12 might interact via a network 14 with the system 16. Further, in one implementation, the system 16 is a multi-tenant cloud computing architecture supporting multiple services, such as software as a service (e.g., customer relationship management (CRM) service provided by salesforce.com, inc.), platform as a service (e.g., execution runtime, database, application development tools; such as Force.com®, Heroku™, and Database.com™ by salesforce.com, inc.), and/or infrastructure as a service (virtual machines, servers, storage). In some implementations, such a platform as a service allows for the creation, management and execution of one or more applications developed by the provider of the service, vendors accessing the service via user systems 12, or third party application developers accessing the system 12. The system 16 may utilize stepped computing resource allocation using a list of computing resource allocation steps 130, as described above. This allows for the system 16 to allocate computing resources 145 in a flexible and configurable manner. For example, the list of computing resource allocation steps 130 can be configured to allocate computing resources 145 for a service (and more specifically for processing items in a queue 150 corresponding to the service) according to a desired computing resource allocation scheme, which allows for more efficient resource utilization, and thus increases performance.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

Each user system 12 is an end user electronic device, such as a desktop personal computer, workstation, laptop, Personal Digital Assistant (PDA), cell phone, etc. Each user system 12 typically includes one or more user interface devices, such as a keyboard, a mouse, trackball, touch pad, touch screen, pen or the like, for interacting with a graphical user interface (GUI) provided on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from a server at system 16 allowing a user of user system 12 to access, process and view information, pages and applications available to it from system 16 over network 14. Such a server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. However, other alternative configurations may be used instead.

In one implementation, tenant data storage 22 is a multi-tenant database management system (DBMS). In a typical multi-tenant DBMS, a single instance of software may be used to store data from multiple vendors (also known as tenants) and each vendor is provided with a dedicated share of the software instance. The term "data record" generally refers to a data entity created by or on behalf of a vendor. A data record is comprised of a set of fields defined within a database. A database can be viewed as a collection of database objects, such as a set of logical tables, containing data fitted into predefined categories. A "table" is one representation of a database object, and may be used herein to simplify the conceptual description of database objects. In the context of a relational database, each relational database table generally contains one or more data categories logically arranged as columns according to a schema, where the columns of the relational database table are different ones of the fields from the plurality of data records, and where each row of the relational database table are different ones of a plurality data records and contains an instance of data for each category defined by the fields. In some implementations of a cloud database (a database that runs on a cloud platform and access to which is provided as a database service), each database object contains a plurality of data records having fields, where identifiers are used instead of database keys, and wherein relationships are used instead of foreign keys. Regardless, by way of example, a data record can be for a business partner or potential business partner of a vendor, and can include information describing an entire company, subsidiaries, and/or contacts at the company. As another example, a data record can be for a project that a vendor is working on, such as an opportunity (e.g., a possible sale) with an existing partner, or a project that the vendor is trying to get. As another example, a CRM database may include: 1) a database object that describes a customer with fields for basic contact information such as name, address, phone number, fax number, etc.; and 2) another database object might describe a purchase order, including fields for information such as customer, product, sale price, date, etc.

In some implementations, the tenant data storage 22 includes one or more databases storing the vendor/tenant data (such as information about the vendor's customers/users, information about the vendor's products/services, marketing materials. Thus, in operation, a vendor, through a user system 12, causes the vendor/tenant data to be stored in the tenant data storage 22. In some implementations, a vendor can access system 16 through user system 12 to access its data stored in tenant data storage 22.

In some implementations, system data storage 24 stores system data 25 accessible to system 16 and possibly multiple tenants, while program code 26 (e.g., a runtime engine that materializes application data from metadata; that is, there is a clear separation of the compiled runtime engine (also known as the system kernel), tenant data, and the metadata that describes each application, which make it possible to independently update the system kernel and tenant-specific applications and schemas, with virtually no risk of one affecting the others) for implementing various functions of system 16. In such implementations, the tenant data storage 22, which is a multi-tenant database management system (DBMS), manages one or more databases storing the vendor/tenant data and vendor/tenant application metadata. The tenant data and the system data may be stored in various databases, such as one or more Oracle® databases.

In one implementation, application platform 18 includes an application setup mechanism that supports application developers' creation and management of applications, which may be saved as metadata into tenant data storage by save routines. Invocations to such applications may be coded using PL/SOQL that provides a programming language style interface. A detailed description of some PL/SOQL language implementations is discussed in U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010. Invocations to applications may be detected by one or more system processes, which manage retrieving application metadata for the subscriber making the invocation and executing the metadata as an application in a virtual machine.

In certain implementations, one or more servers of system 16 is configured to handle requests for any user associated with any organization that is a tenant. Because it is desirable to be able to add and remove servers from the server pool at any time for any reason, there is preferably no server affinity for a user and/or organization to a specific server. In one implementation, therefore, an interface system implementing a load balancing function (e.g., an F5 Big-IP load balancer) is communicably coupled between the servers of system 16 and the user systems 12 to distribute requests to the servers. In one implementation, the load balancer uses a least connections algorithm to route user requests to the servers. Other examples of load balancing algorithms, such as round robin and observed response time, also can be used. For example, in certain implementations, three consecutive requests from the same user could hit three different servers, and three requests from different users could hit the same server. In this manner, by way of example, system 16 is multi-tenant, wherein system 16 handles storage of, and access to, different database objects, data and applications across disparate users and organizations.

In certain implementations, user systems 12 (which may be client systems) communicate with the servers of system 16 to request and update system-level and tenant-level data from system 16 that may involve sending one or more queries to tenant data storage 22 and/or system data storage 24. In one implementation of system 16, a server in system 16 automatically generates one or more SQL statements (e.g., one or more SQL queries) that are designed to access the desired information. System data storage 24 may generate query plans to access the requested data from the database.

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, teaches systems and methods for creating custom database objects as well as customizing standard database objects in a multi-tenant DBMS. In certain implementations, for example, all data records of a custom data object are stored in a single multi-tenant physical table, which may contain multiple logical database objects per organization. It is transparent to customers of the system 16 that their multiple database objects are in fact stored in one large table or that their data may be stored in the same table as the data of other customers.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," "some implementations," etc., indicate that the implementation described may include a particular feature, structure, or characteristic, but every implementation may not necessarily include the particular feature, structure, or characteristic.

Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method by a computing device to allocate computing resources for processing items in a queue using a list of computing resource allocation steps, the method comprising:
    determining a total amount of computing resources that are to be allocated for processing items in the queue based on a current number of items in the queue and the list of computing resource allocation steps, wherein the list of computing resource allocation steps specifies a plurality of ordered steps, each step in the plurality of ordered steps defining a rate at which additional computing resources are allocated for processing items in the queue when the number of items in the queue is within a particular range, wherein the plurality of ordered steps specified by the list of computing resource allocation steps includes a first step and a second step that is later in order than the first step, wherein a rate defined by the first step in the plurality of ordered steps is different from a rate defined by the second step in the plurality of ordered steps, wherein the total amount of computing resources that are to be allocated for processing items in the queue is determined as a sum of a number of computing resources added in each of the plurality of ordered steps, wherein the number of computing resources added in the second step is determined based on a number of items not covered by all previous steps in the plurality of ordered steps that are earlier in order relative to the second step in the plurality of ordered steps and the rate defined by the second step in the plurality of ordered steps; and
    adjusting an amount of computing resources allocated for processing items in the queue to match the determined total amount.

2. The method of claim 1, wherein each of the plurality of ordered steps specifies a number of items per computing resource for that step and a maximum number of computing resources for that step.

3. The method of claim 2, wherein the total amount of computing resources that are to be allocated for processing items in the queue is determined by an equation:

$$\sum_{i=1}^{Z}\left(\text{MIN}\left(M_i,\left(\text{MAX}\left(0,\text{CEIL}\left(\frac{X-\sum_{j=0}^{i-1}(D_jM_j)}{D_i}\right)\right)\right)\right)\right)=N,$$

where N refers to the amount of computing resources to allocate, i refers to a step number of a step in the plurality of ordered steps, Z refers to a maximum step number, X refers to the number of items in the queue, D refers to a number of items per computing resource for a step, and $M_i$ refers to a maximum number of computing resources for an $i^{th}$ step.

4. The method of claim 1, wherein the rate defined by the first step is higher than the rate defined by the second step.

5. The method of claim 1, wherein the rate defined by the first step is lower than the rate defined by the second step.

6. The method of claim 1, further comprising:
    receiving the list of computing resource allocation steps via an Application Programming Interface (API).

7. The method of claim 1, wherein when the queue is associated with a service for premium users, the list of computing resource allocation steps is configured to implement a computing resource allocation scheme where an initial rate at which computing resources are allocated is higher than a rate for non-premium users.

8. The method of claim 1, further comprising:
    determining a total amount of computing resources that are to be allocated for processing items in a second queue based on a current number of items in the second queue and a second list of computing resource allocation steps.

9. A computing device configured to allocate computing resources for processing items in a queue using a list of computing resource allocation steps, the computing device comprising:
    one or more processors; and
    a non-transitory machine-readable storage medium having instructions stored therein, which when executed by the one or more processors, causes the computing device to:
        determine a total amount of computing resources that are to be allocated for processing items in the queue based on a current number of items in the queue and the list of computing resource allocation steps, wherein the list of computing resource allocation steps specifies a plurality of ordered steps, each step in the plurality of ordered steps defining a rate at which additional computing resources are allocated for processing items in the queue when the number of items in the queue is within a particular range, wherein the plurality of ordered steps specified by the list of computing resource allocation steps includes a first step and a second step that is later in order than the first step, wherein a rate defined by the first step in the plurality of ordered steps is different from a rate defined by the second step in the plurality of ordered steps, wherein the total amount of computing resources that are to be allocated for processing items in the queue is determined as a sum of a number of computing resources added in each of the plurality of ordered steps, wherein the number of computing resources added in the second step is determined based on a number of items not covered by all previous steps in the plurality of ordered steps that are earlier in order relative to the second step in the plurality of ordered steps and the rate defined by the second step in the plurality of ordered steps and adjust an amount of computing resources allocated for processing items in the queue to match the determined total amount.

10. The computing device of claim 9, wherein each of the plurality of ordered steps specifies a number of items per computing resource for that step and a maximum number of computing resources for that step.

11. The computing device of claim 10, wherein the total amount of computing resources that are to be allocated for processing items in the queue is determined by an equation:

$$\sum_{i=1}^{Z}\left(\text{MIN}\left(M_i, \left(\text{MAX}\left(0, \text{CEIL}\left(\frac{X - \sum_{j=0}^{i-1}(D_j M_j)}{D_i}\right)\right)\right)\right)\right) = N,$$

where N refers to the amount of computing resources to allocate, i refers to a step number of a step in the plurality of ordered steps, Z refers to a maximum step number, X refers to the number of items in the queue, D refers to a number of items per computing resource for a step, and $M_i$ refers to a maximum number of computing resources for an $i^{th}$ step.

12. The computing device of claim 9, wherein the rate defined by the first step is higher than the rate defined by the second step.

13. The computing device of claim 9, wherein the rate defined by the first step is lower than the rate defined by the second step.

14. The computing device of claim 9, wherein the instructions, when executed by the one or more processors, causes the computing device to access the list of computing resource allocation steps from a relational database.

15. A non-transitory machine-readable storage medium having instructions stored therein, which when executed by one or more processors of a computing device, causes the computing device to perform operations for allocating computing resources for processing items in a queue using a list of computing resource allocation steps, the operations comprising:

determining a total amount of computing resources that are to be allocated for processing items in the queue based on a current number of items in the queue and the list of computing resource allocation steps, wherein the list of computing resource allocation steps specifies a plurality of ordered steps, each step in the plurality of ordered steps defining a rate at which additional computing resources are allocated for processing items in the queue when the number of items in the queue is within a particular range, wherein the plurality of ordered steps specified by the list of computing resource allocation steps includes a first step and a second step that is later in order than the first step, wherein a rate defined by the first step in the plurality of ordered steps is different from a rate defined by the second step in the plurality of ordered steps, wherein the total amount of computing resources that are to be allocated for processing items in the queue is determined as a sum of a number of computing resources added in each of the plurality of ordered steps, wherein the number of computing resources added in the second step is determined based on a number of items not covered by all previous steps in the plurality of ordered steps that are earlier in order relative to the second step in the plurality of ordered steps and the rate defined by the second step in the plurality of ordered steps; and adjusting an amount of computing resources allocated for processing items in the queue to match the determined total amount.

16. The non-transitory machine-readable storage medium of claim 15, wherein each of the plurality of ordered steps specifies a number of items per computing resource for that step and a maximum number of computing resources for that step.

17. The non-transitory machine-readable storage medium of claim 16, wherein the total amount of computing resources that are to be allocated for processing items in the queue is determined by an equation:

$$\sum_{i=1}^{Z}\left(\text{MIN}\left(M_i, \left(\text{MAX}\left(0, \text{CEIL}\left(\frac{X - \sum_{j=0}^{i-1}(D_j M_j)}{D_i}\right)\right)\right)\right)\right) = N,$$

where N refers to the amount of computing resources to allocate, i refers to a step number of a step in the plurality of ordered steps, Z refers to a maximum step number, X refers to the number of items in the queue, D refers to a number of items per computing resource for a step, and $M_i$ refers to a maximum number of computing resources for an $i^{th}$ step.

18. The non-transitory machine-readable storage medium of claim 15, wherein the rate defined by the first step is higher than the rate defined by the second step.

19. The non-transitory machine-readable storage medium of claim 15, wherein the rate defined by the first step is lower than the rate defined by the second step.

20. The non-transitory machine-readable storage medium of claim 15, wherein the instructions, when executed by the one or more processors, causes the computing device to determine a total amount of computing resources that are to be allocated for processing items in a second queue based on a current number of items in the second queue and a second list of computing resource allocation steps and adjust an amount of computing resources allocated for processing items in the second queue to match the determined total amount of computing resources that are to be allocated for processing items in the second queue.

* * * * *